(12) United States Patent
Sun

(10) Patent No.: US 11,288,268 B2
(45) Date of Patent: Mar. 29, 2022

(54) PROCESSING A USER DATABASE QUERY

(71) Applicant: SingleStore, Inc., San Francisco, CA (US)

(72) Inventor: Zhou Sun, San Francisco, CA (US)

(73) Assignee: SingleStore, Inc., San Francisco, CA (US)

( * ) Notice: Subject to any disclaimer, the term of this patent is extended or adjusted under 35 U.S.C. 154(b) by 231 days.

(21) Appl. No.: 16/669,683

(22) Filed: Oct. 31, 2019

(65) Prior Publication Data

US 2021/0133192 A1   May 6, 2021

(51) Int. Cl.
*G06F 16/24* (2019.01)
*G06F 16/2453* (2019.01)
*G06F 8/41* (2018.01)

(52) U.S. Cl.
CPC .......... *G06F 16/24542* (2019.01); *G06F 8/41* (2013.01); *G06F 16/24537* (2019.01)

(58) Field of Classification Search
CPC ...................... G06F 16/24542; G06F 16/24537
See application file for complete search history.

(56) References Cited

U.S. PATENT DOCUMENTS

| | | | |
|---|---|---|---|
| 7,634,459 B1* | 12/2009 | Eshet | G06F 16/217 |
| 7,974,969 B1* | 7/2011 | Balbirsky | G06F 16/217 |
| | | | 707/713 |
| 10,089,281 B1* | 10/2018 | Neumann | G06F 40/126 |
| 11,055,331 B1* | 7/2021 | Neumann | G06F 16/334 |
| 2013/0332434 A1* | 12/2013 | Sompolski | G06F 16/24544 |
| | | | 707/701 |
| 2021/0026851 A1* | 1/2021 | Kaul | G06F 16/24535 |

* cited by examiner

*Primary Examiner* — Eliyah S. Harper
(74) *Attorney, Agent, or Firm* — EIP US LLP

(57) ABSTRACT

In an example there is provided a computer-implemented method comprising generating an execution plan for a received user query in a structured query language, the execution plan having a number of operators for operating on data from a content database; compiling the operators into corresponding byte code and machine code; executing the operators by first interpreting the corresponding byte code; switching to executing the operators by executing the corresponding machine code when compiled.

16 Claims, 6 Drawing Sheets

```
No-op
Clear stack buffer
Copy register 1 [Sort address]
Copy register 2 [Row x address]
Copy register 3 [Row y address]
Call Interp (SCAN)
Return register
```

```
Jmp compiled_function_Addr
Clear stack buffer
Copy register 1 [Sort address]
Copy register 2 [Row x address]
Copy register 3 [Row y address]
Call Interp (SCAN)
Return register
```

PROCESSING A USER DATABASE QUERY

BACKGROUND OF THE INVENTION

Field of the Invention

The present application relates to processing and executing user search queries in relation to data in databases.

Description of the Related Technology

As technologies advance, the amount of information stored in electronic form and the desire for real-time or pseudo real-time ability to search, organize and/or manipulate such information is ever increasing. Database management systems, sometimes also referred to as databases and data warehouses, are designed to organize data in a form that facilitates efficient search, retrieval or manipulation of select information. Typical database management systems allow a user to submit a "query" or call one or more functions in a query language for searching, organizing, retrieving and/or manipulating information that satisfies particular function parameters.

In a typical database management system, a user query comprises one or more structured query language (SQL) statements which are parsed and converted into an execution plan by an optimizer. The execution plan is then compiled into code for execution in order to process the query and return an answer. The execution plan may be compiled into a runtime operator tree, or byte code, or a combination of the two, which is then interpreted by an interpreter. Alternatively, the execution plan can be compiled directly into machine or assembly code and executed.

BRIEF DESCRIPTION OF THE DRAWINGS

Various features of the present disclosure will be apparent from the detailed description which follows, taken in conjunction with the accompanying drawings, which together illustrate, features of the present disclosure, and wherein.

DETAILED DESCRIPTION OF CERTAIN EMBODIMENTS

Figure 1:
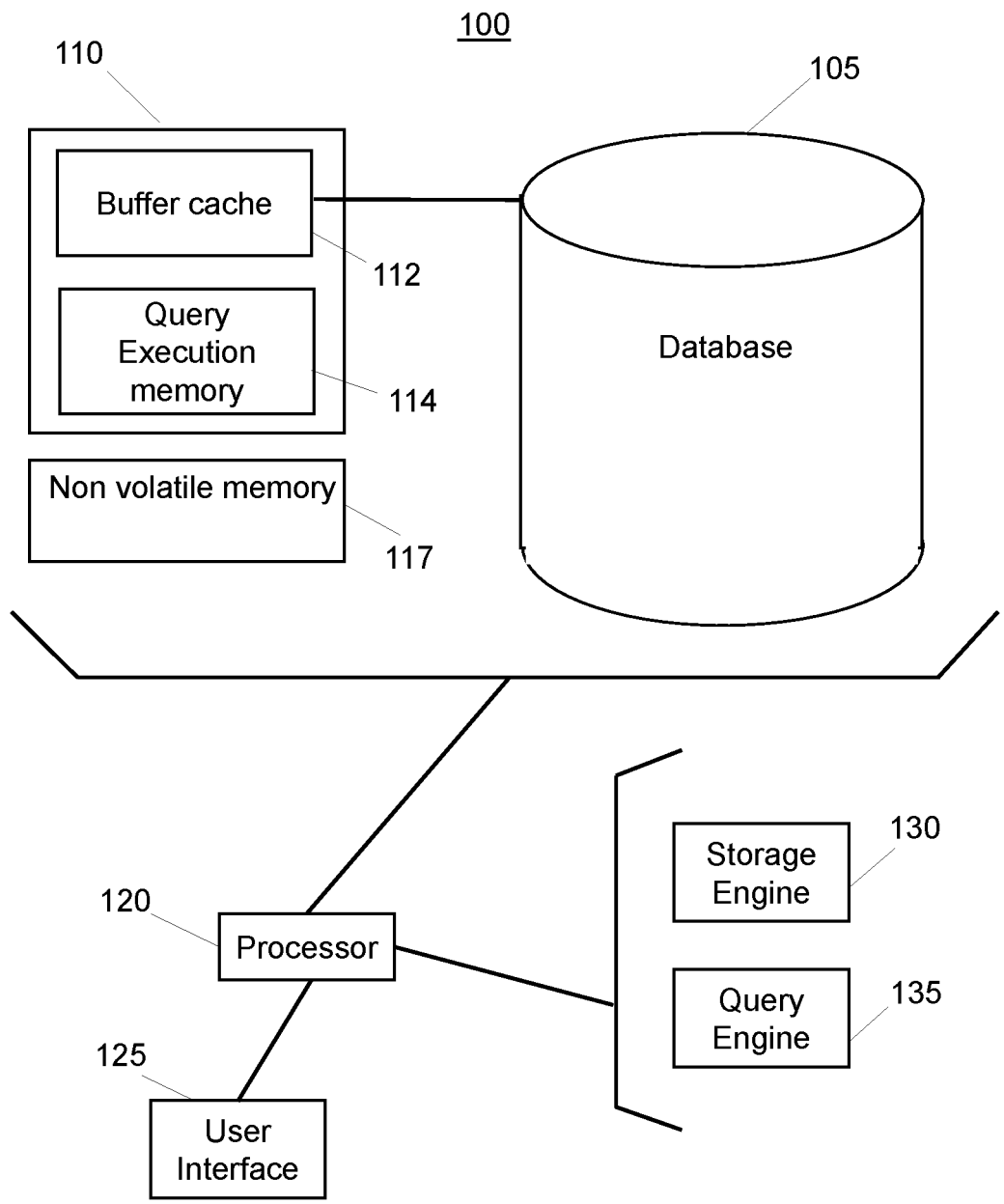
FIG. 1 is a schematic diagram of a database management system according to an example.

FIG. 1 shows a database management system 100 for managing a database 105 including processing user queries relating to data stored in the database. The database 105 may be any suitable database for non-volatile storage of data which may be arranged in column store, row store or any other suitable format. The database may include disk-based column store data and in-memory row store data backed by snapshots on non-volatile storage. The database management system comprises volatile memory 110 such as RAM for temporarily holding and manipulating data from the database. This may include a buffer cache 112 where parts of the column store data from the disk are cached and a query execution memory 114 for holding temporary hash tables, sort runs, and other data used during processing of the user query. Modified data from the buffer cache 112 may subsequently be used to update data stored in the database 105. The database management system also comprises a non-volatile memory 117 which stores computer programs used to control the cache 110, the database 105 and to provide functionality to enable processing of user queries. The non-volatile memory 117 may also store query plans permanently or for long periods spanning restarts. The non-volatile memory 117 may comprise a code base for storing compiled functions which may be reused for later user queries.

The processor 120 is used to load and execute programs stored on the non-volatile memory 117 and to process data held on the buffer cache 112 and query execution memory 114. The programs stored on the non-volatile memory 115 may, when loaded and executed by the processor 120, implement a storage engine 130 for controlling data retrieved from and written to the database 105, a query and execution engine 135 (also known as a query engine) for processing user queries and executing code generated from an execution plan.

The database management system 100 also comprises a user interface 125 which may include a monitor, keyboard and mouse or other components in order to allow a user to enter user queries and to receive answers to these queries. The user queries may be entered as SQL statements and the answers may be data from the database arranged into a new table for example.

Figure 2:
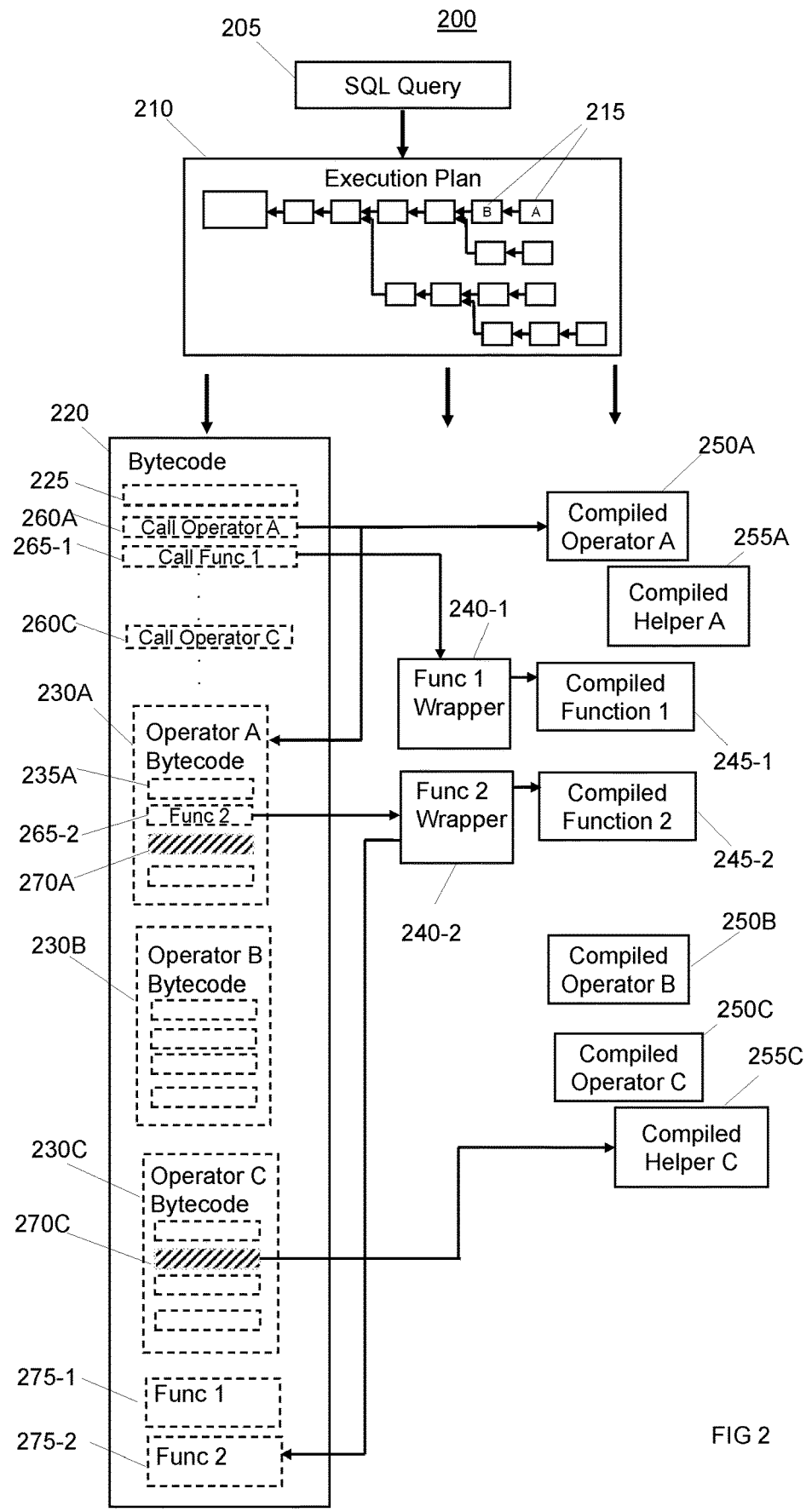
FIG. 2 is a schematic diagram illustrating processing and executing of a user query according to an example.

FIG. 2 illustrates processing and executing an SQL user query according to an example. The SQL query 205 is parsed and optimized in order to generate an execution plan 210. This may be implemented by the query engine 135 which includes a parsing function including syntax check, semantic check and a shared pool check. The syntax check ensures that the format of the SQL statement meets the SQL language rules. The semantic check determines the meaning of each statement including required operations and specified data resources from the database. The shared pool check determines whether the intended set of operations on the specified data has already been processed into an executable format, in which case this executable format can be reused rather than processed again. An optimization process generates multiple execution plans capable of carrying out the required operations and determines which of these plans has a lowest cost. The lowest cost plan corresponds to the optimal execution plan 210 to be executed. The execution plan comprises a number of operators 215 arranged in sequential and parallel orders for execution. Example operators include TABLESCAN, MERGE JOIN, COMPUTE SCALAR, CLUSTERED INDEX SCAN, SORT and many others.

It is known to compile an execution plan into byte code, such as that produced from Java source code for submission to the Java runtime, where each operator is compiled into a block of byte code which is called and interpreted by an interpreter in order to execute the execution plan. Such an approach provides fast compilation into the byte code blocks, but slow execution as the interpreter carries out the actions specified in the byte code line by line. In an alternative approach, the execution plan may be compiled directly into machine code which can then be executed much more quickly by the processing system than byte code which requires the intermediate interpreter. However compiling to machine code, so called code generation, takes more time than compiling into byte code and so whilst this route is usually faster overall, especially when processing large or complex queries, it can be slower to start returning results to the user, and may be slower overall for some queries. Therefore a user may notice a perceptible delay in returning results using either approach.

The user query processing of FIG. 2 uses a modified approach for executing the execution plan 210 in which the operators are compiled to byte code blocks 230A, 230B, 230C each corresponding to an operator 215, and also compiled to machine code blocks 250A, 250B, 250C each also corresponding to an operator 215. Execution of the execution plan 210 then starts with interpreting the compiled byte code blocks 230A, 230B, 230C but switches to the complied machine code blocks 250A, 250B, 230C when they become available from the code generation process. Code generation may be performed in parallel with compilation of the byte code blocks or it may start once interpretation of the byte code blocks begins. This execution approach allows for a faster start as well as a faster overall completion time for executing the execution plan 210. An example implementation of this approach is described in more detail below with respect to FIGS. 2 and 3.

Figure 3:
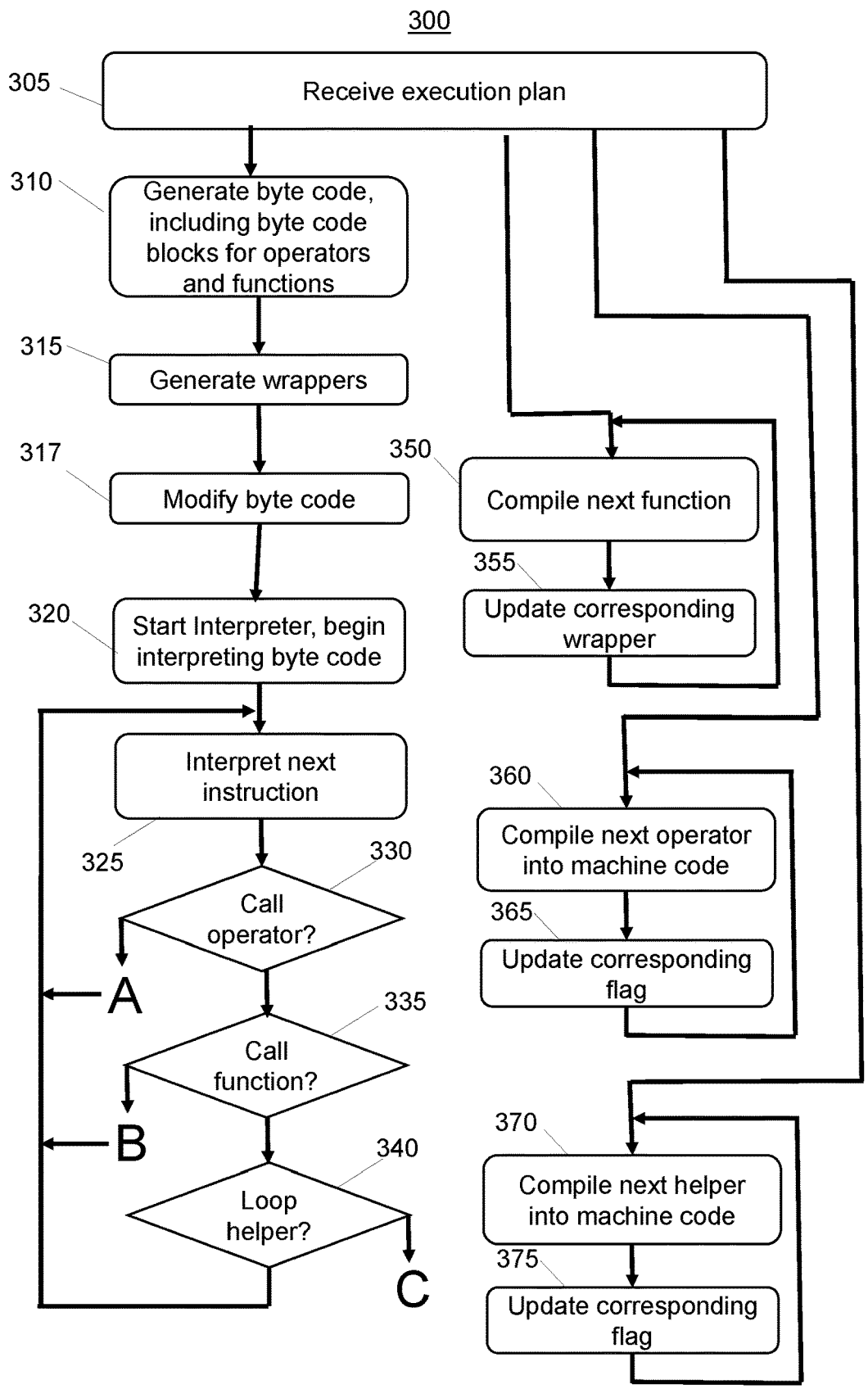
FIG. 3 is a flowchart of a method of executing a user query according to an example.

A method of executing an execution plan is shown in FIG. 3. This method 300 may be executed by the processor 120 to implement part of the query and execution engine 135 of FIG. 1. The method 300, at 305, receives an execution plan 210 for execution. The execution plan may be generated by any known process and comprises a number of operators 215.

At 310, the method generates a byte code execution plan 220 including byte code blocks 230A, 230B, 230C for the operators 215. The byte code execution plan 220 may also include byte code functions 275-1 and 275-2 which can implement common or lengthy program logic required by one or more operators, for example a COMPARISON function. For simplicity of explanation only a limited number of byte code blocks are shown for operators and functions, however it will be appreciated that byte code blocks are provided for each unique operator of the execution plan and each function that may be used for their execution. The byte code execution plan 220 also includes lines 225 of opcodes or instructions which may call the operators and functions as well as handle local variables and other standard tasks in order to execute the execution plan. The byte code execution plan 220 may be generated using a known compiler and subsequently modified in order to allow for use in this example. This allows for use of a standard byte code compiler in order to reduce costs and complexity.

At 315, the method generates wrappers 240-1, 240-2 which are short segments of machine code used to check if a corresponding function 245-1, 245-2 has been compiled, and if so to jump to this or if not to call the Interpreter to interpret the corresponding function byte code blocks 275-1, 275-2. The wrappers are fast to generate and do not significantly impact the processor time required to process and execute the user query when interpreting the byte code execution plan.

At 317, the method modifies the byte code execution plan 220 to include one or more of the following: replace calls to the functions 275-1, 275-2 with calls to corresponding wrappers 240-1, 240-2; replace calls to the operator blocks 230A, 230B, 230C with conditional checks to determine if the corresponding compiled machine code operator 250A, 250B, 250C is available and if so to call that instead; replace jump opcodes in one or more byte code loops in an operator byte code block 230A, 230B, 230C with a new JumpOrCallHelper opcode in order to break out of a bytecode loop into the corresponding compiled machine code operator to execute the operator using the faster method.

Local variables need to be shared between the byte code and compiled machine code versions of the operators and functions and this can be achieved by storing these in predetermined buffers rather than registers, these buffers being available to both the byte code and machine code blocks of the operators and functions. These and other modifications may be made using an OptimisationPass procedure on the byte code execution plan 220. By separately modifying the byte code execution plan 220 at 317, a standard byte code generator may be used initially to generate the byte code (at 310). Alternatively however, a modified generator may be used to generate modified byte code directly from the execution plan.

At 320, the method starts an Interpreter to interpret the modified byte code execution plan 220 line by line 225. This may start by calling operators and functions using the byte code blocks 230A, 230B, 230C, 275-1, 275-2, but will increasingly call the corresponding compiled machine code operators and functions 250A, 250B, 250C, 245-1, 245-2 as these become available. This allows execution of the execution plan to start quickly without having to wait for compilation of all the operators and functions, and also accelerates execution of the execution plan as these operator and functions are compiled, thus potentially allowing short-running queries to run to completion before compilation is finished, improving user response time for first execution of such queries.

Compilation of various machine code blocks functions, operators and helpers are shown in parallel branches and may be started when generating the byte code execution plan 220 or later, for example once the byte code is completed and interpretation of this starts at 320. The machine code blocks include operators 250A, 250B, 250C, functions 245-1, 245-2 and helpers which correspond with operator machine code blocks but allow execution to switch from a byte code operator block 230A, 230C to the corresponding helper 255A, 255C during interpretation of the byte code block 230A, 230C. This allows execution of the execution plan to switch from byte code interpretation to machine code execution as soon as the machine code is compiled, including during a byte code loop.

At 350, a first/next function 245-1, 245-2 is compiled. The functions may be compiled first as they are likely to be required first, for example an initial TABLE SCAN, and therefore the speed of execution would benefit from using the compiled version of the functions if these are available early. The functions themselves may be prioritized with functions likely to be used first compiled first. This may be advantageous for simple lightweight loops that do not require significant code generation time, for example for the TableScan operation.

Figures 6, 7, 8:
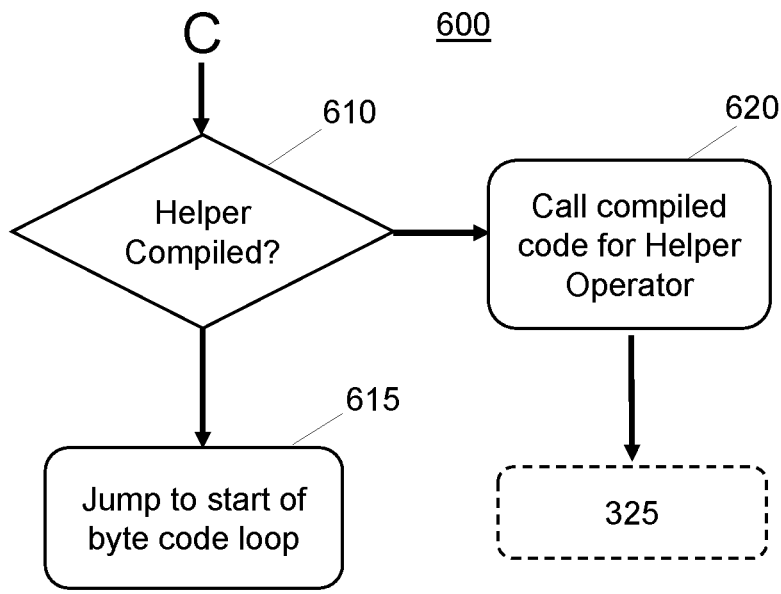
FIG. 6 is a flowchart of a method of executing an operator when breaking out of loop, according to an example.
FIG. 7 is pseudo-code of a wrapper for a byte-code block according to an example.
FIG. 8 is updated pseudo-code for the wrapper of FIG. 7, according to an example.

At 355, once a function has been compiled into a machine code block 245-1, 245-2, the wrapper 240-1, 240-2 corresponding to the compiled function is updated and the method returns to compile the next function. Example pseudo-code for a wrapper is shown in FIG. 7 and initially includes a no-op or "no operations" line which results in no action being taken upon execution of the wrapper. The wrapper is updated by changing the no op to a function pointer to the memory address of the corresponding compiled machine code for the same operator when the code generation process for this has been completed.

FIG. 7 shows an example wrapper which may correspond to a comparison function used by an operator having associated starting row x and ending row y parameters or arguments which are normally added to registers of the processor 120 when interpreting the byte code block. The wrapper copies these values to buffers or addresses in the cache so that they can be subsequently passed to the interpreter to perform comparison between certain fields in the row. The wrapper may also perform other functions such as clearing the stack buffer. The wrapper then calls the Interpreter to interpret the byte code block 275-1, 275-2 corresponding to the function, in this example SCAN, together with arguments or parameters to identify the data in the database on which the SCAN operation is to be performed. FIG. 8 shows the updated wrapper in which the no op has been replaced by a function pointer to the address of the compiled function. The next time the wrapper is called the method will jump directly to the compiled version of the function which will execute much faster than interpreting the corresponding byte code block for the function.

The byte code blocks 230A, 230B, 230C, 275-1, 275-2 include a number of statements 225 or lines of byte code representing functionality which is interpreted by the interpreter by first compiling each line into assembly or machine code appropriate for the underlying processing system, for example using a virtual machine running on the processor which is operating in accordance with a particular operating system. Once compiled into assembly or machine code the virtual machine executes this process and the interpreter moves to the next line of byte code.

At 360, a first/next operator 250A, 250B, 250C is compiled. Operators are for processing relational algebra operations for example JOIN, SCAN, FILTER, AGGREGATE, compared with functions which are used by operators to perform smaller processes like comparing two values. The operators likely to be used first may be compiled first in order to increase the overall speed of execution of the execution plan 210. At 365, a flag or other indicator corresponding to the compiled operator is set to indicate that the operator is compiled, and the method returns to compile the next operator. The operator flag may be checked by the Interpreter when calling the operator and the compiled machine code block 250A, 250B, 250C called if the flag is set, or else the byte code block 230Am 230B, 230C called if the flag is not set. The flag may be associated with an identifier for the compiled machine code block so that the Interpreter can call this identifier, and have it recognized by the underlying Virtual Machine process. The identifier or name for the file may be added to the byte code during a further modifying step or the machine code block may be renamed to a predetermined name already used in the byte code execution plan 220. In an alternative arrangement, a wrapper may be used similar to that described above in which a function pointer replaces a no op instruction and points to the start of the compiled operator.

At 360, a first/next helper 255A or 255C is compiled. A helper is a compiled version of an operator, but one which can be started part way through when part of the operator functionality has already been implemented by the Interpreter interpreting the byte code block 230A, 230C version of the operator. This means that once the compiled helper version 255A, 255C of the operator is compiled, the method can break out of the byte code version 230A, 230C into the helper. This is especially useful in byte code loops which may need thousands, millions or even billions of iterations. Without such a break mechanism, the method would need to continue iterating the loop in the byte code block until completed which may take considerable further time, even when the compiled machine code block version of the operator is available. A modified byte code opcode JumpOrCallHelper may be used to implement this as will be described in more detail below.

At 365, a flag or other indicator corresponding to the compiled helper is set and the method returns to compile the next helper. The helper flag may be checked by the Interpreter during each iteration of a byte code loop and the compiled helper machine code block 255A, 255C called if set or else the byte code block loop continued if not set. A line of byte code 270A, 270C is indicated as providing this functionality within the byte code blocks 230A, 230C for the operators. As with the operator flags, the helper flags may be associated with an identifier for the compiled machine code blocks 255A, 255C so that the Interpreter can call this identifier, and have it recognized by the underlying Virtual Machine process. The identifier or name for the file may be added to the byte code during a further modifying step or the machine code block may be renamed to a predetermined name already used in the byte code execution plan 220. In an alternative arrangement, a wrapper may be used similar to that described above in which a jump instruction replaces a no op instruction and which points to the start of the compiled helper.

Returning to the first branch of the method where the Interpreter has been started and begins interpreting the byte code execution plan 220 at step 320. The Interpreter steps through the byte code line by line 225, with the opcodes or instructions in each line being interpreted at 325. The Interpreter may carry out the functionality implied by the line of byte code as is known, however for certain instructions the following routines are used. At 330, if the byte code line is to call an operator, the method of FIG. 4 indicated by path A is used. At 335, if the byte code line is to call a function, the method of FIG. 5 indicated by path B is used. At 340, if the byte code line is to try jumping out of a loop, the method of FIG. 6 indicated by path C is used. The method 300 then returns to interpret the next line of byte code at 325.

Figure 4:
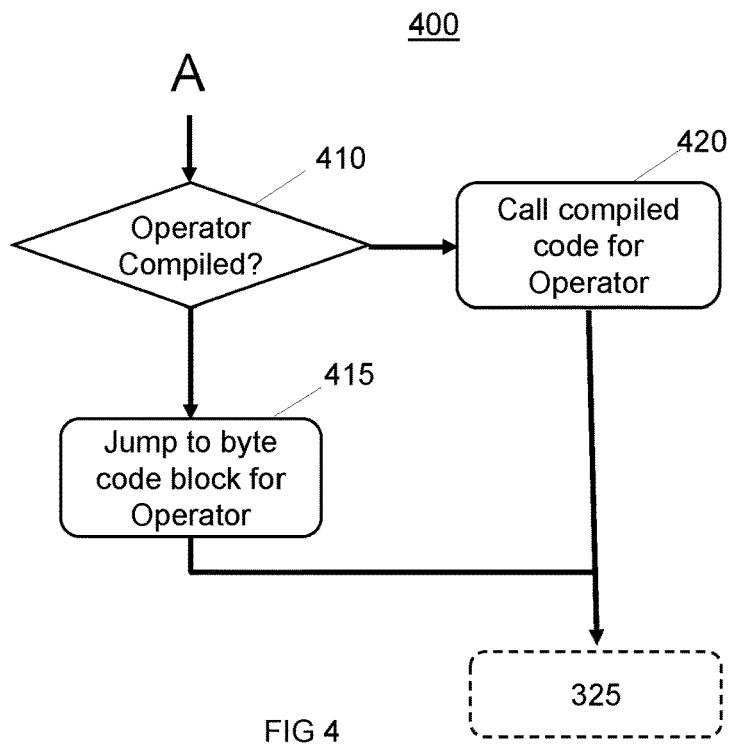
FIG. 4 is a flowchart of a method of executing an operator according to an example.

When the byte code instruction is to call an operator, the byte code used is modified compared with known operator calls. Referring to FIG. 4, rather than just calling the byte code block 230A, 230B, 230C corresponding to the operator, at 410 the byte code instruction first checks a flag to determine if the compiled machine code block 250A, 250B, 250C corresponding to the operator has been compiled. If it has, at 420 the compiled version of the operator is called. If compilation has not yet completed, the byte code version of the operator is called at 415. In both cases, the method then returns to step 325 in FIG. 3 to interpret the next line of byte code. Appropriate parameters or arguments are passed to both versions of the operator. This may be achieved in the case of the machine code version by adding the parameters or arguments to a predetermined buffer which the machine code block 250A, 250B, 250C addresses. Similarly, any local variables needed may be passed across in this way.

Figure 5:
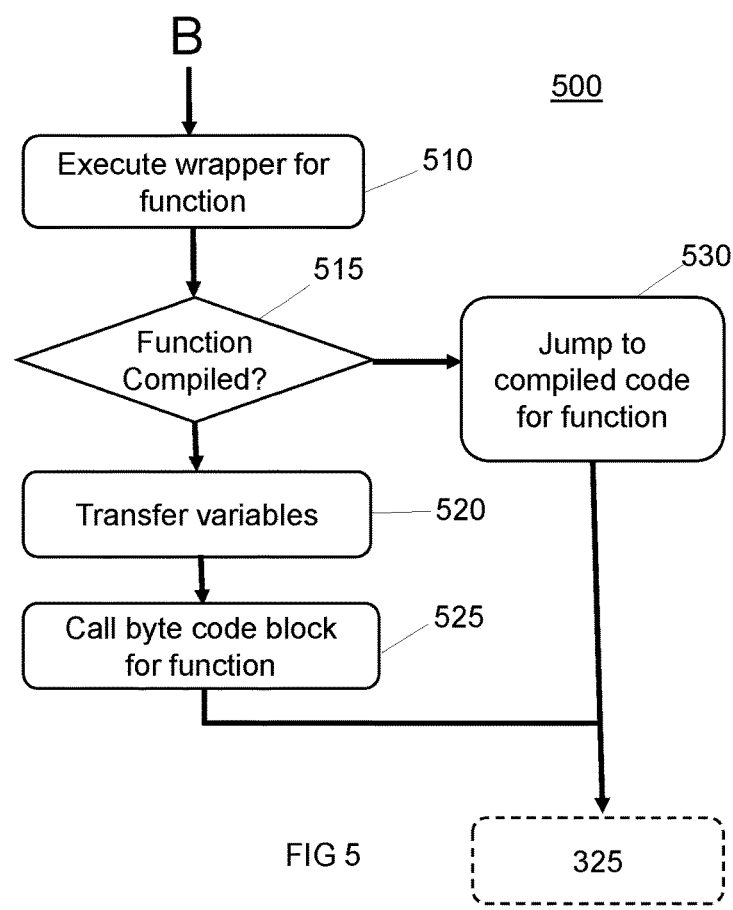
FIG. 5 is flowchart of a method of executing a function according to an example.

When the byte code instruction is to call a function, the byte code used is modified compared with known function calls. Referring to FIG. 5, rather than just calling the byte code block 275-1, 275-2 corresponding to the function, at 510 the method executes the wrapper 240-1, 240-2 corresponding to the function. This may be achieved by calling the wrapper or jumping to a particular memory location corresponding to the start of the wrapper. At 515, the method determines whether a function pointer corresponding to the compiled version of the function has been provided in the wrapper. This is implemented as described above by replacing a no op with a jump to memory address instruction, which corresponds to the memory address of the start of the compiled function. If the function pointer exists, then the method jumps to the compiled machine code for the function at 530. If the no op has not yet been replaced by a function pointer, the method transfers variables at 520. As previously described, pseudocode for an example wrapper with the no op not yet replaced, and with the no op replaced by a function pointer is shown in FIGS. 7 and 8 respectively. At 525 the method then calls the Interpreter to interpret the byte code block corresponding to the function. Once the function has been evaluated using the byte code block 275-1 at 525 or the compiled machine code block 245-1, 245-2 at 530, the method returns to step 325 of FIG. 3 to interpret the next line of byte code.

When the byte code instruction is to jump to the beginning of a loop in a byte code operator block 230A, 230B, 230C, the byte code used is modified compared with known loop jump opcodes. Referring to FIG. 6, rather than just returning to the beginning of the loop using a jump opcode, a new JumpOrCallHelper opcode is used. This is used to implement modified functionality in the Interpreter. At 610, the method checks whether the helper corresponding to the current operator has been compiled. This may be achieved by checking a corresponding flag or using the no op function pointer replacement approach in a corresponding wrapper, both as previously described. If the helper 255A, 255B has not yet been compiled, the method jumps back to the start of the byte code loop as normal at 615. If the helper corresponding to the current operator has been compiled, the method calls the compiled helper at 620. Once the helper has been executed the method returns to step 325 in FIG. 3.

At 620, the helper may be called using a predetermined identifier, modifying the byte code to add an identifier for the helper which can be called when the flag is set, or by using a wrapper as previously described. The helper 255A, 255C implements the same functionality as the corresponding compiled operator 250A, 250C, however it allows this to be performed partially so that it can be completed when part of the work has already been performed by the corresponding byte code block 230A, 230C. In order to do this the helper includes additional variables to be passed across, for example to indicate the number of iterations of the loop which have already been completed by the byte code block, the value of local variables used within the loop as well as other parts of the operator.

The use of these helpers 255A, 255C allows the execution process to move from interpreting byte code to executing machine code corresponding to the same operator once the machine code has been compiled, even if the byte code block is still being interpreted. This may be useful where the interpreter is in a loop in the byte code block which would otherwise take some time to complete. By placing the call to the helper function within the loop, the compilation status of the machine code can be checked at every iteration of the loop and not just when the operator is called In some examples, the compiled operators, helpers and other functions may return an offset to allow the byte code execution plan 220 to handle any faults that may have occurred when executing these compiled machine code blocks 250A, 250B, 250C, 255A, 255C, 245-1, 245-2. These may be the same fault handling byte code lines used for handling faults occurring during interpretation of the byte code execution plan 220. If there are no faults, the execution process jumps back to the next line of byte code as previously.

As generation of complied machine code blocks for the operators of the execution plan is completed, the execution process jumps to these blocks which significantly speeds up execution of the execution plan compared with relying on interpreting byte code blocks. For example, where there are multiple SCAN operators in the execution plan, the first SCAN operator may be performed using interpretation of the corresponding byte code block however all subsequent SCAN operators may be performed by executing the compiled machine code block. Because the process starts by compiling and interpreting byte code blocks, the process can start much faster than were it to wait for code generation of all the operators. As the wrappers and helper functions (if used) are lightweight their code generation time is small so that this additional process does not impact of the overall execution time for the execution plan.

As more and more of the machine code blocks 250A, 250B, 250C of the operators are compiled, the execution process accelerates. The overall execution process may be further optimized by scheduling code generation or machine code compilation of functions, operators and helpers according to the likelihood of early and/or repeated use of certain types of these processes. Alternatively, or additionally, operators or functions that take significant time to execute using an interpreter may be compiled into machine code blocks first, for example the first table scan and merge join which may only be called once but can take up a significant proportion of the execution time. In some examples, before calling the interpreter the stack space may be checked by the wrapper and if there is not enough space, the execute process may wait until the operator is compiled into a machine code block and then jump to the compiled machine code version.

Figure 9:
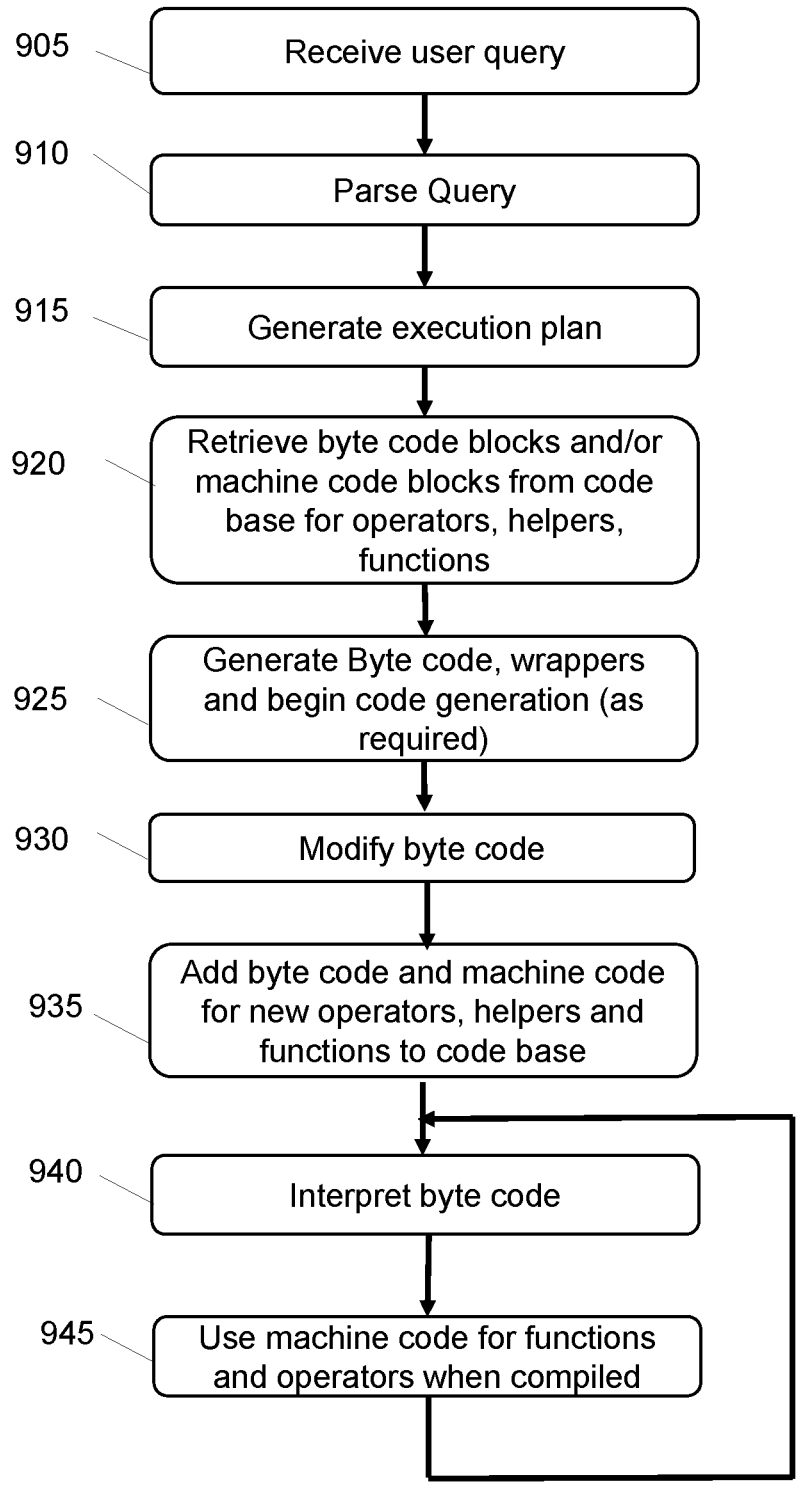
FIG. 9 is a flowchart of a method of processing and executing a user query according to an example.

FIG. 9 is a flow chart illustrating another example which reuses already compiled byte code and/or machine code for operators in an execution plan. This method can be used in combination with aspects of the method 300 previously described. The method 900, at 905, receives a user query relating to data items in a database, for example an SQL query. At 910 the user query is parsed, including performing syntax and semantic checks and converting the user query into operations for handling data from the database. At 915, various way of implementing this using combinations of operators are generated, and an optimal execution plan is determined. These steps may be implemented using known query processing means.

At 920, the method checks a code base for byte code blocks and/or machine code blocks corresponding to each operator, helper or function. Reuse of a byte code block avoids the need to compile that process into a byte code block and similarly reuse of a machine code block for the process avoids the need to compile that process into a machine code block. Where the machine code block is available for a process such as an operator, helper or function, this is loaded. A modified wrapper may be generated with a function pointer to the start address of the loaded machine code block. In this case there is no need to also compile the operator into a byte code block.

At 925, the method compiles operators and functions into byte code blocks where these operators or functions do not already have byte code or machine code blocks in the code base. The method 900 also generates wrappers and begins code generation or compiling operators, functions and helpers into machine code where these processes do not already have machine code blocks in the code base. At 930, the method 900 modifies the byte code as previously described with respect to the method 300 of FIG. 3.

At 935, newly generated byte code blocks and newly compiled machine code blocks are added to the code base so that these may be available for subsequent user queries. The code base may be an area of non-volatile memory 117 used to store byte code and machine code blocks. These can then be loaded into the query execution memory 114 of the system 100 for execution.

At 940, the method interprets the byte code as previously described in the method 300 of FIG. 3. This may include initially interpreting byte code blocks whilst simultaneously generating machine code and switching to machine code versions of the operators once these are available.

At 945, once a machine code block for an operator, helper or function has been compiled, the method switches to using this instead of the byte code version. The method also adds the compiled code to the code base for subsequent reuse, for example for a later user query requiring the same operator.

At least some aspects of the examples described herein comprise computer processes performed in processing systems or processors. However, in some examples, this may extend to computer programs, particularly computer programs on or in a carrier, adapted for putting the examples into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

In the preceding description, for purposes of explanation, numerous specific details of certain examples are set forth. Reference in the specification to "an example" or similar language means that a particular feature, structure, or characteristic described in connection with the example is included in at least that one example, but not necessarily in other examples The above examples are to be understood as illustrative. It is to be understood that any feature described in relation to any one example may be used alone, or in combination with other features described, and may also be used in combination with one or more features of any other of the examples, or any combination of any other of the examples. Furthermore, equivalents and modifications not described above may also be employed.

What is claimed is:

1. A computer-implemented method comprising:
generating an execution plan for a received user query in a structured query language, the execution plan having a number of operators for operating on data from a content database;
compiling the execution plan into corresponding byte code and executing the execution plan by
interpreting the corresponding byte code;
compiling at least some of the operators of the execution plan into machine code at a time overlapping with compiling the execution plan into byte code and interpreting said byte code;
switching executing the execution plan by interpreting the byte code to executing the at least some of the operators by executing the corresponding machine code when the compiling the at least some operators into machine code has completed.

2. The method of claim 1, wherein executing a said operator comprises an Interpreter checking a flag indicating completion of the machine code corresponding to the operator and calling the compiled machine code operator if completed or jumping to the byte code corresponding to the operator.

3. The method of claim 2, further comprising compiling the operator into helper machine code and wherein executing the operator comprises the Interpreter:
interpreting the byte code corresponding to the operator;
within a loop of the byte code checking a flag indicating completion of the helper machine code corresponding to the operator:
calling the compiled helper machine code operator if completed or continuing interpreting the loop.

4. The method of claim 1, further comprising compiling one or more functions into machine code and generating a machine code wrapper for each function, and wherein interpreting said functions called in the byte code by calling the respective wrapper.

5. The method of claim 4, wherein the wrappers initially comprise a no op which is replaced when the corresponding function is compiled with a jump instruction to the compiled function.

6. The method of claim 1, wherein variables used by the byte code corresponding to an operator are copied into a buffer for use by the compiled machine code corresponding to the operator.

7. The method of claim 1, wherein compiling the operators into corresponding byte code or machine code comprises loading byte code or machine code corresponding to the operators from a codebase.

8. A database management system comprising:
a memory;
a storage engine to control writing and retrieval of data between the memory and a database;
a query and execution engine to:
generate an execution plan in the memory from a user query, the execution plan having a number of operators for operating on data from the database;
compile the execution plan into byte code and execute the execution plan by interpreting the byte code;
compile at least some operators of the execution plan into machine code at a time overlapping with compiling the execution plan into byte code and interpreting said byte code;
switch from executing the execution plan by interpreting the byte code to executing the at least some of the operators by executing the machine code corresponding to the at least some of the operators when the machine code corresponding to the at least some operators has finished compiling.

9. The system of claim 8, further comprising an Interpreter to interpret byte code corresponding to the execution plan including to check a flag indicating completion of machine code corresponding to an operator and to call the compiled machine code if completed or to jump to byte code corresponding to the operator.

10. The system of claim 8,
the query and execution engine to compile the operators into corresponding helper machine code;
the Interpreter to interpret the byte code corresponding to a said operator and within a loop of the byte code to check a flag indicating completion of the helper machine code corresponding to the operator, and to call the compiled helper machine code operator if completed or to jump to the start of the byte code loop.

11. The system of claim 8, further comprising an Interpreter and wherein the query and execution engine to compile one or more functions into machine code and to generate a machine code wrapper for each function, the Interpreter to interpret said functions called in the byte code by calling the respective wrapper.

12. The system of claim 11, wherein the wrappers initially comprise a no op which is replaced when the corresponding function is compiled with a jump instruction to the compiled function.

13. The system of claim 12, wherein the wrappers comprise a call to the byte code for the function after the no op.

14. The system of claim 8, wherein the memory comprises buffers to copy variables used by the byte code corresponding to an operator for use by the compiled machine code corresponding to the operator.

15. The system of claim 8, further comprising a codebase to store for reuse compiled byte code and machine code corresponding to the operators.

16. A computer readable medium comprising instructions that, when executed by a processor of a computer, cause a computer comprising the processor to:

generate an execution plan for a received user query in a structured query language, the execution plan having a number of operators for operating on data from a content database;

compile the execution plan into corresponding byte code and executing said execution plan;

by interpreting the corresponding byte code;

compile at least some operators of the execution plan into machine code at a time overlapping with compiling the execution plan into byte code and interpreting said byte code;

switch from executing the execution plan by interpreting the byte code to executing to executing the at least some operators by executing the corresponding machine code has completed compiling.

* * * * *